United States Patent
Dalcher (10) Patent No.: US 8,613,084 B2
(45) Date of Patent: Dec. 17, 2013

(54) SYSTEM, METHOD, AND COMPUTER PROGRAM PRODUCT FOR DETECTING AT LEAST POTENTIALLY UNWANTED ACTIVITY BASED ON EXECUTION PROFILE MONITORING

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1504 days.

(21) Appl. No.: 11/857,373

(22) Filed: Sep. 18, 2007

(65) Prior Publication Data

US 2013/0276110 A1 Oct. 17, 2013

(51) Int. Cl.
*G06F 21/00* (2013.01)

(52) U.S. Cl.
USPC .......................................... 726/22

(58) Field of Classification Search
USPC ...................... 726/22–25; 713/188
See application file for complete search history.

(56) References Cited

U.S. PATENT DOCUMENTS

| | | | |
|---|---|---|---|
| 6,684,329 B1 | 1/2004 | Epstein et al. | 713/150 |
| 2002/0162024 A1 | 10/2002 | Cunchon et al. | 713/201 |
| 2002/0178271 A1 | 11/2002 | Graham et al. | 709/229 |
| 2004/0117658 A1 | 6/2004 | Klaes | 713/201 |
| 2004/0133777 A1 | 7/2004 | Kiriansky et al. | 713/166 |
| 2005/0081019 A1 | 4/2005 | DeWitt, Jr. et al. | 712/227 |
| 2005/0091558 A1 | 4/2005 | Chess et al. | 714/38 |
| 2005/0125687 A1 | 6/2005 | Townsend et al. | 713/200 |
| 2005/0149726 A1 | 7/2005 | Joshi et al. | 713/164 |
| 2005/0188210 A1 | 8/2005 | Perlin et al. | 713/183 |
| 2007/0204257 A1* | 8/2007 | Kinno et al. | 717/100 |

FOREIGN PATENT DOCUMENTS

| | | | |
|---|---|---|---|
| JP | 2004-126854 | * | 4/2004 |
| JP | 2004287810 | * | 10/2004 |

OTHER PUBLICATIONS

Henry Hanping Feng, Oleg M. Kolesnikov, Prahlad Fogla, Wenke Lee and Weibo Gong, "Anomaly Detection Using call Stack Information", May 2003, The Proceedings of IEEE Symposium on Security and Privacy, pp. 1-14.*

Fernandes, "WindowSecurity.com: Proxy Instalation," Dec. 16, 2002, http://www.windowsecurity.com/whitepapers/Proxy_installation_.html.

Feng, Henry Hanping et al. "Anomaly Detection Using Cell Stack Information," Dept of Electrical and Computer Engineering, University of Massachusetts, Amherst, MA, pp. 1-14.

* cited by examiner

*Primary Examiner* — Joseph P. Hirl
*Assistant Examiner* — John B King
(74) *Attorney, Agent, or Firm* — Wong, Cabello, Lutsch, Rutherford & Brucculeri, LLP (57) ABSTRACT

A system, method, and computer program product are provided for detecting at least potentially unwanted activity based on execution profile monitoring. In use, an execution profile of code is monitored utilizing call frame monitoring. Further, at least potentially unwanted activity is detected based on the monitoring of the execution profile.

17 Claims, 5 Drawing Sheets

SYSTEM, METHOD, AND COMPUTER PROGRAM PRODUCT FOR DETECTING AT LEAST POTENTIALLY UNWANTED ACTIVITY BASED ON EXECUTION PROFILE MONITORING

FIELD OF THE INVENTION

The present invention relates to security systems, and more particularly to monitoring for unwanted activity.

BACKGROUND

Security systems have traditionally been developed for detecting unwanted activity. For example, unwanted activity has generally included malware, etc. However, such security systems have generally exhibited various limitations in detecting unwanted activity capable of evading detection techniques utilized by such security systems.

For example, the security systems oftentimes provide limited coverage due to performance and compatibility concerns, operating system limitations, etc. In addition, unwanted activity has increasingly been tailored to avoid detection via conventional detection techniques. Such tailoring has sometimes involved employing activities which target the areas in computer systems with limited coverage provided by the security systems.

There is thus a need for addressing these and/or other issues associated with the prior art.

SUMMARY

A system, method, and computer program product are provided for detecting at least potentially unwanted activity based on execution profile monitoring. In use, an execution profile of code is monitored utilizing call frame monitoring. Further, at least potentially unwanted activity is detected based on the monitoring of the execution profile.

DETAILED DESCRIPTION

Figure 1:
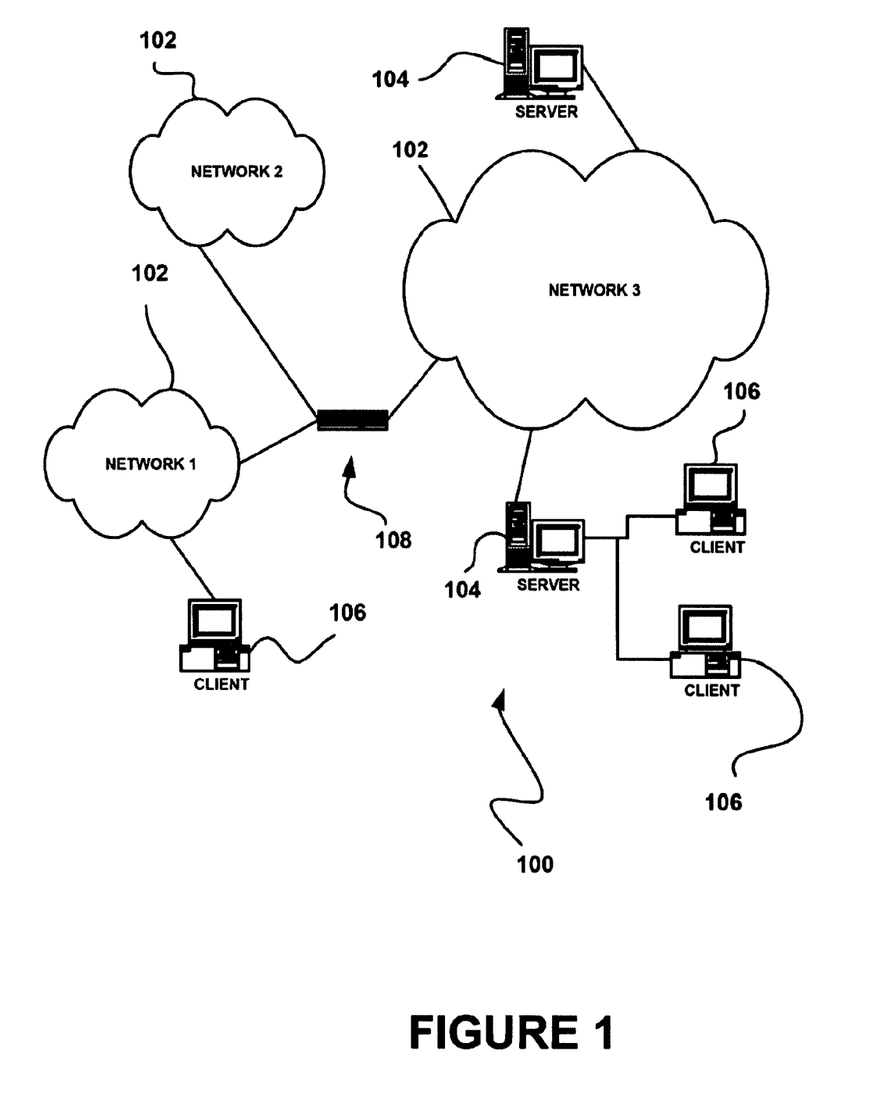
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
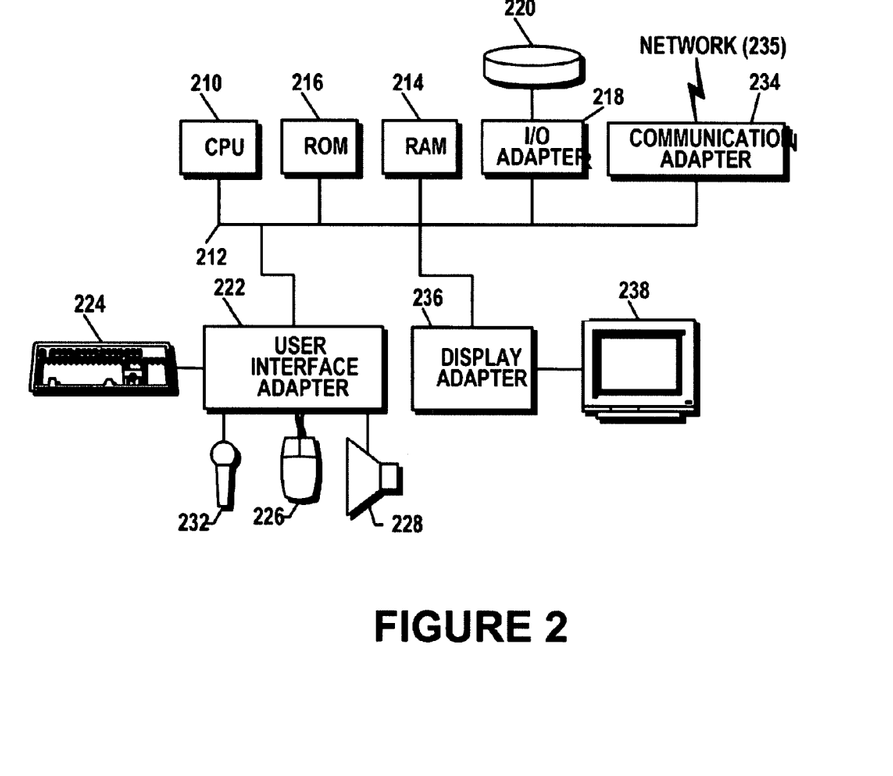
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
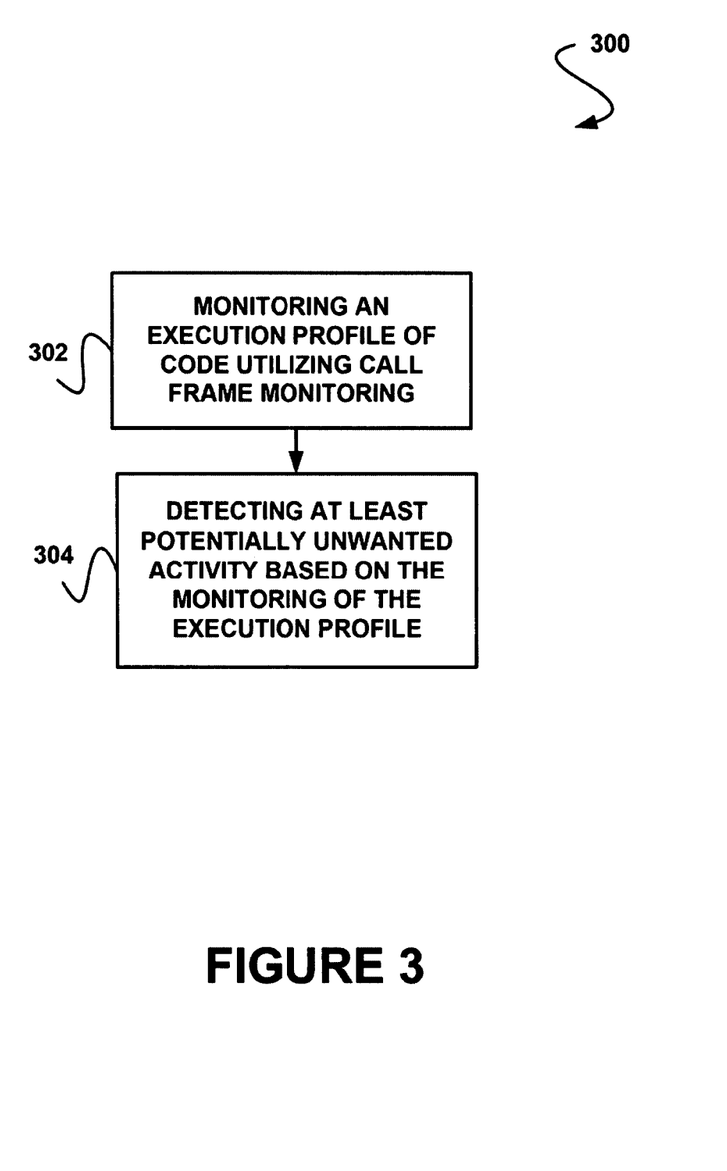
FIG. 3 shows a method for detecting unwanted activity based on execution profile monitoring, in accordance with one embodiment.

FIG. 3 shows a method 300 for detecting at least potentially unwanted activity based on execution profile monitoring, in accordance with one embodiment. As an option, the method 300 may be carried out in the context of the architecture and environment of FIGS. 1 and/or 2. Of course, however, the method 300 may be carried out in any desired environment.

As shown in operation 302, an execution profile of code is monitored utilizing call frame monitoring. In the context of the present description, the code may include any code for which an associated execution profile may be monitored. For example, the code may include executable code. As another example, the code may include code of an application. Further, the code may be associated with any device capable of storing, executing, etc. the code, including, for example, any of the devices described above with respect to FIGS. 1 and/or 2.

Optionally, the code may be associated with an event. For example, the code may be the source of the event (e.g. the code that initiated the event, etc.). In various embodiments, the event may include invocation of a monitored (e.g. hooked, etc.) interface, generation of an interrupt (e.g. software and/or hardware interrupt), invocation of a registered callback, an artificially generated test event, etc. In one optional embodiment, the execution profile monitoring may be initiated in response to the event.

Additionally, in the context of the present description, the execution profile of the code may include any information associated with execution of the code. In one embodiment, the execution profile may include event handling associated with the code. In another embodiment, the execution profile may indicate components (e.g. of a software environment, etc.) executed by the code, invoked by the code, etc. Such components may include executable modules (e.g. libraries, etc.), application program interfaces (APIs), sub-functions, etc. In yet another embodiment, the execution profile may include an execution path of the code.

To this end, monitoring the execution profile of the code may include identifying the execution profile. The execution profile may be identified utilizing virtualization, inline hooks, etc. As another option, monitoring the execution profile may include analyzing the execution profile. It should be noted that such analysis may be performed in any desired manner.

Just by way of example, the analysis may include comparing the execution profile to a known legitimate execution profile of the code. Optionally, such known legitimate execution profile may be determined based a history of execution profiles associated with the code. As another option, the known legitimate execution profile may be determined by analyzing a history of characteristics and/or usage of executable memory and/or any other memory regions associated with the code.

Furthermore, the call frame monitoring may include any monitoring of call frames associated with the code, in the context of the present description. Each of such call frames may optionally include a return address, locals, and/or parameters associated with the code. For example, the monitoring may include identifying such call frames. The monitored call frames may include those added to an execution stack (e.g. call stack, etc.) and/or removed from the execution stack, for example.

As another example, the invocation of interfaces (e.g. APIs) may utilize a call-return where an invoker calls the interface and the interface returns to the caller when completed. Each such invocation may involve the utilization of at least a minimal call frame used to facilitate the safe return to the invoking code. Call frame monitoring may inspect the utilization of these call frames to invoke interfaces, thus allowing call frame monitoring, in one embodiment. Such monitoring may be applied to externally visible and internal interfaces. Of course, it should be noted that the call frames may be monitored in any desired manner.

Thus, the execution profile of the code may be monitored by identifying call frames associated with the code via the call frame monitoring. Moreover, at least potentially unwanted activity is identified based on the monitoring of the execution profile, as shown in operation 302. In the context of the present embodiment, the unwanted activity may include any activity determined to be unwanted. For example, the unwanted activity may include malware.

It should be noted that the potentially unwanted activity may be detected in any manner that is based on the monitoring of the execution profile. In one embodiment, the potentially unwanted activity may be detected if monitoring of the execution profile indicates that the code is associated with potentially unwanted activity. For example, the execution profile may indicate that the code is a source of the potentially unwanted activity. In another embodiment, the potentially unwanted activity may be detected based on a behavioral analysis of the monitored execution profile.

In another embodiment, the potentially unwanted activity may be detected if monitoring of the execution profile indicates that the code is not associated with a legitimate execution profile. Just by way of example, the legitimacy of the execution profile may be determined based on an analysis of the execution path, such as an analysis of executable memory indicated by the execution profile. Optionally, a legitimate execution profile may include an execution profile with characteristics (e.g. processes, module, etc.) expected to be associated with the code. For example, the legitimate execution profile may include characteristics and/or component usage noted as being associated with the code during a plurality of previous executions of the code.

To this end, at least potentially unwanted activity may be detected based on execution profile monitoring of code that utilizes call frame monitoring. For example, the monitored execution profile may indicate patterns of malicious activity. In one embodiment, detecting unwanted activity based on such execution profile monitoring may allow subversion of legitimate execution paths by malware to be detected.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
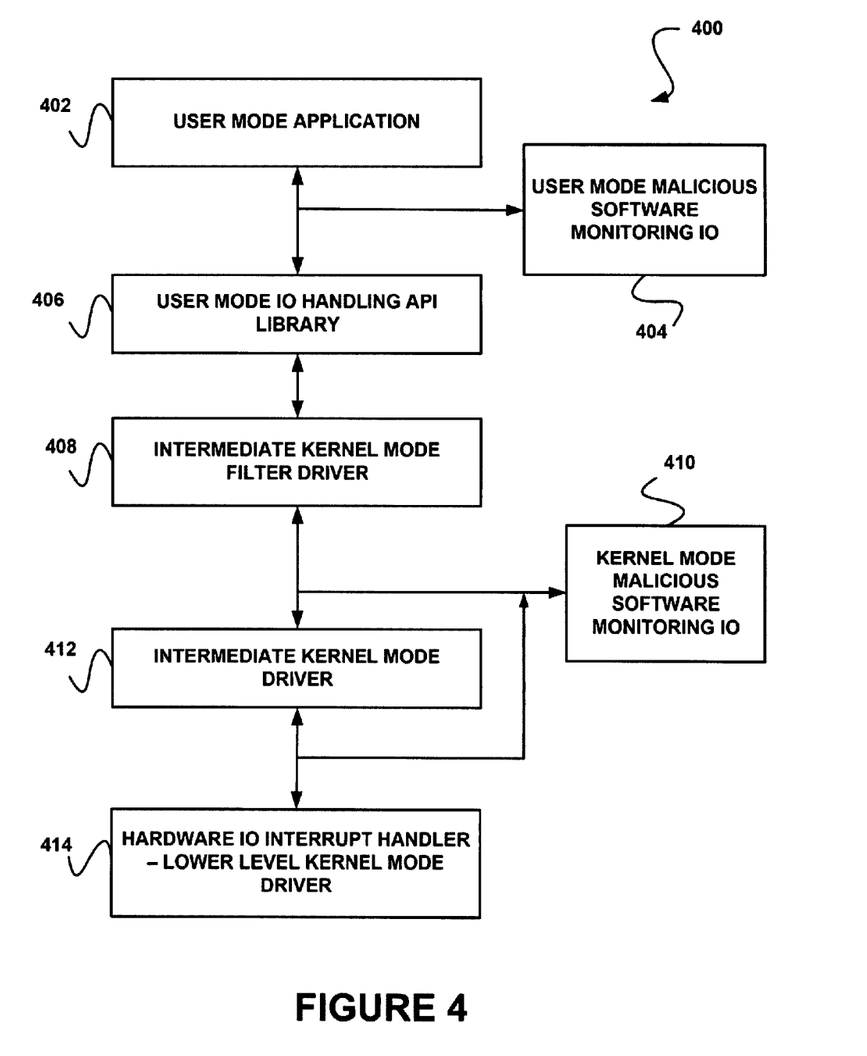
FIG. 4 shows a system in which malware is inserted into processing associated with input/output operations, in accordance with another embodiment.

FIG. 4 shows system 400 in which malware is inserted into processing associated with input/output operations, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a user mode application 402 is in communication with a user mode input/output (IO) handling API library 406. The user mode application 402 may include any application capable of being utilized by a user of a device. For example, the user mode application 402 may include a web browser. To this end, the user mode application 402 may be utilized by a user for performing IO operations (e.g. keystroke operations, etc.).

Further, the user mode IO handling API library 406 may include any library utilized by the user mode application 402 for IO handling associated with the user mode application 402. For example, the user mode IO handling API library 406 handle IO operations associated with the user mode application 402. As also shown, a user mode malicious software monitoring IO 404 may be inserted at a user mode level (e.g. of an operation system). In one embodiment, user mode malicious software monitoring IO 404 may include code capable of monitoring and/or intercepting IO operations at the user mode level, such as, for example, IO operations performed utilizing the user mode application 402.

Additionally, the user mode IO handling API library 406 is in communication with an intermediate kernel mode filter driver 408. The intermediate kernel mode filter driver 408 may include any driver capable of filtering data at the kernel mode level. Also, the intermediate kernel mode filter driver 408 is in communication with an intermediate kernel mode driver 412. In another embodiment, a kernel mode malicious software monitoring IO 410 may be inserted at an intermediate kernel mode level, as shown. For example, the kernel mode malicious software monitoring IO 410 may include code capable of monitoring and/or intercepting IO operations at the intermediate kernel mode level.

Still yet, the intermediate kernel mode driver 412 is in communication with a hardware IO interrupt handler and lower level kernel mode driver 414. Thus, the hardware IO interrupt handler and lower level kernel mode driver 414 may operate at the low kernel mode level. In yet another embodiment, the kernel mode malicious software monitoring IO 410 may also be inserted at the low kernel mode level, for monitoring and/or intercepting IO operations at the low kernel mode level.

To this end, IO operations may be legitimately handled (e.g. without monitoring by malicious software) in situations where the user mode malicious software monitoring IO 404 and the kernel mode malicious software monitoring IO 410 are not present in the system 400. However, monitoring IO operations may be performed by malware for gathering data associated with the IO operations at various system levels (e.g. utilizing the user mode malicious software monitoring IO 404 and/or the kernel mode malicious software monitoring IO 410).

Figure 5:
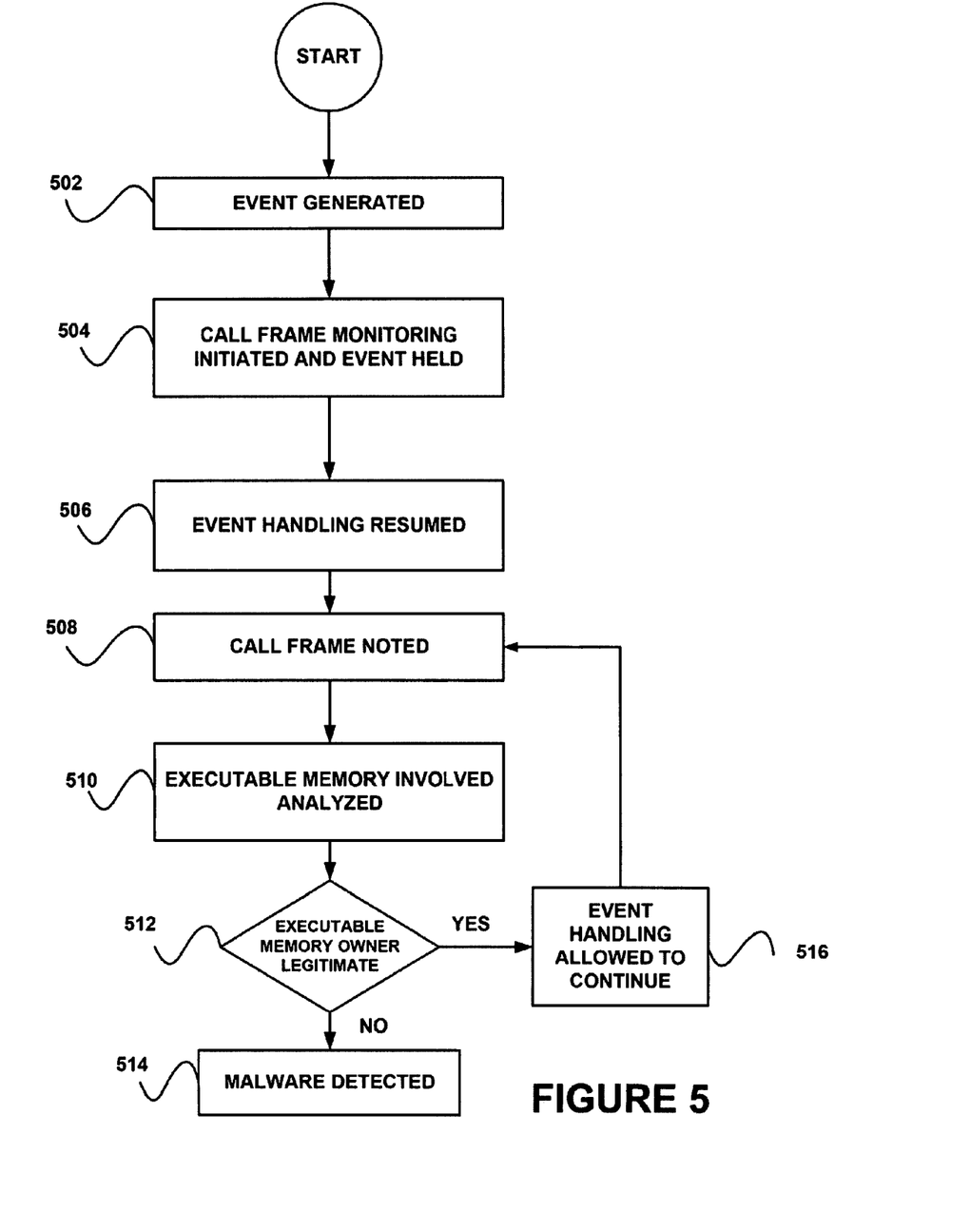
FIG. 5 shows a method for detecting malware utilizing call frame monitoring, in accordance with yet another embodiment.

FIG. 5 shows a method 500 for detecting malware utilizing call frame monitoring, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, an event is generated. In the context of the present embodiment, the event may include any event associated with code that is capable of being identified. In one embodiment, the event may include invocation of a registered callback. For example, the callback may be registered with another event, such that the callback is performed in response to the other event. Optionally, the callback may be registered with an operating system, an underlying infrastructure, etc.

In various other embodiments, the event may include invocation of a monitored (e.g. hooked) interface, generation of a software and/or a hardware interrupt, an artificially generated (e.g. by a user, etc.) test event submitted to a registered handler of the event type, etc. To this end, the event may be generated deliberately (e.g. for profiling purposes, etc.), such as, for example, based on a user instruction. As another option, the event may be generated as a natural occurrence (e.g. during code execution, etc.) and intercepted (e.g. for execution profiling purposes, etc.).

In addition, call frame monitoring is initiated and the event is held, as shown in operation 504. In one embodiment, the call frame monitoring may be initiated by initializing the call frame monitoring. For example, a scope of the call frame monitoring may be set. Optionally, the call frame monitoring may be set to monitor call frames associated with the event, and thus to monitor the handling of the event.

As another option, the call frame monitoring may be set to monitor only a currently executing thread associated with the generated event (e.g. to only monitor execution within the thread). As yet another option, the call frame monitoring may be set to monitor only a currently executing process associated with the event (e.g. to only monitor execution within the process). Further, the scope of the call frame monitoring may be set by a user. Setting such scope may allow performance impact and/or resource consumption to be limited, in an optional embodiment.

In another embodiment, the event may be held by temporarily preventing execution of code associated with the thread. For example, control may be temporarily passed from code associated with the event to other code. Of course, it should be noted that the event may be held in any manner. In this way, the event may be held during initiation of the call frame monitoring.

Furthermore, as shown in operation 506, event handling is resumed. Resuming the event handling may include resuming execution of the code associated with the event. Just by way of example, the event handling may be resumed by returning control to the event. In this way, handling of the event may be allowed to proceed.

Still yet, a call frame is noted, as shown in operation 508. In the context of the present embodiment, the call frame may be noted utilizing the call frame monitoring initiated in operation 504. In one embodiment, the call frame may be noted by monitoring call frames removed from the execution stack.

In one embodiment, the call frame monitoring may utilize virtualization for noting the call frame. In another embodiment, the call frame monitoring may utilize direct code execution monitoring via inline hooks (e.g. control transfer instructions). Just by way of example, such virtualization and/or inline hooks may be utilized for noting a call frame removed from the execution stack. U.S. patent application Ser. No. 11/749,635, filed May 16, 2007, and entitled "System, Method And Computer Program Product For Analyzing Stack Call Frames That Are Monitored While A Stack Is Unwound," which is incorporated herein by reference, describes one example of monitoring in which successive layers of an execution stack are rolled back as each invocation layer returns to an associated caller.

In another embodiment, the call frame monitoring may utilize a static analysis of layered call frames for noting the call frame. For example, frame pointers may be utilized to locate each call frame in the execution stack. Such frame pointer utilization may be combined with a runtime stack analysis, as also described in U.S. patent application Ser. No. 11/749,635.

In yet another embodiment, the call frame may be noted by monitoring new call frames added to an execution stack. For example, call ("CALL") instruction execution which invokes an interface may be monitored. Further, inline hooking may be utilized where existing CALL instructions in a section of code to be monitored are replaced with a hooking instruction to transfer control to the monitoring of the event. Such inline hooking may be optionally only be utilized when monitoring events associated with code less than a predetermined threshold size.

As another example, the execution of the call instruction may be monitored via an enabling technology such as virtualization. Such enabling technology may optionally eliminate extensive inline hooks, reducing complexity and impact to the code associated with the event. As an option, filtering capabilities may also be provided by the enabling technology.

Just by way of example, the call instruction execution described above may be performed in a similar manner described with respect to return ("RET") instruction monitoring disclosed in the abovementioned U.S. patent application Ser. No. 11/749,635. Additionally, U.S. patent application Ser. No. 11/673,762, filed Feb. 12, 2007, and entitled "System, Method And Computer Program Product For Utilizing Code Stored In A Protected Area Of Memory For Securing An Associated System," also describes monitoring control transfer instructions including monitoring return instructions.

While various embodiments have been described for noting the call frame, it should be noted that the call frame may be noted in any desired manner. Further, noting such call frame may indicate call frame usage associated with the event, and thus at least a portion of an execution profile of code associated with the event. In this way, monitoring call frames may be utilized for monitoring the execution profile of code associated with the event.

Still yet, as shown in operation 510, executable memory associated with the noted call frame is analyzed. The executable memory may include any memory utilized with respect to execution of the call frame. In one embodiment, the analysis of the noted call frame may include determining a type of the memory utilized during the execution of the call frame. For example, if the call frame was noted in response to addition of the call frame to the execution stack (e.g. such that the call frame is a newly created call frame), the executable memory may be identified by determining a location to which an intercepted call instruction associated with such call frame points. As another example, if the call frame was noted in response to a removal of the call frame from the execution stack, the executable memory may be identified by determining a location to which an intercepted return instruction associated with such call frame points.

To this end, information associated with a location, which the noted call frame indicates execution is about to occur, may be identified in the form of a call frame execution target address. In response to a determination of the call frame execution target address, characteristics of memory pointed to by the call frame execution target address may be determined. In one embodiment, the memory may include memory backed by a loaded executable such as an executable application file or a loadable library. In another embodiment, the memory may include allocated memory (e.g. allocated at runtime) that is not backed by a loaded executable. In this way, a type of memory (e.g. memory backed by a loaded executable, allocated memory, etc.) utilized with respect to execution of the noted call frame may be identified.

In another embodiment, analyzing the executable memory may include identifying an owner of the memory. For example, if the memory is backed by a loaded executable, the file path of the executable may be determined. As another example, if the memory includes allocated memory not backed by an executable, a process and thread that created the memory may be retrieved.

In one embodiment, such process and thread may be retrieved by identifying a record of tracked memory regions. The memory regions may include any portions of memory in a system (e.g. device, etc.) capable of being tracked. Further, the memory regions may be tracked in any manner.

In one embodiment, memory regions within a monitored process associated with the event may be tracked. For example, it may be determined whether a memory region includes allocated memory, a data section, etc. Thus, memory regions, such as memory dynamically allocated within a process, may be enumerated and tracked.

At initialization, all dynamically allocated memory within the monitored process may be enumerated. For example, the enumeration may include checking stack address ranges for each thread currently in existence, walking a chain of memory regions allocated from a heap, walking chains of memory regions allocated from kernel mode memory pools, such as kernel mode paged and non-paged memory pools. In some embodiments, the ability to walk these chains for kernel mode pool memory and associated already allocated regions with the process being monitored may be limited, depending upon operating system characteristics. Thus, the pool memory allocated or its properties modified after initialization may be tracked. As another option, pool memory may be tracked globally without association with a particular process.

Additional areas of memory to be monitored may also be enumerated during initialization. Examples of such areas may include the data sections within a process. An internal data structure may also be populated with results of the enumeration, to facilitate tracking of dynamically allocated memory regions, and optionally to allow efficient determination of whether a memory address lies within a dynamically allocated memory region.

Also at initialization, monitoring may be enabled for interfaces used to control dynamically allocated memory. In this way, whenever memory is dynamically allocated, resized, deleted, its properties changed, etc., callbacks may be invoked. Such invoked callbacks may allow updating of an internal data structure utilized for tracking dynamic memory within the monitored process.

In one embodiment, the tracking of dynamically allocated memory may include noting characteristics of the usage of interfaces providing memory allocation, deletion, property modification, etc. For example, the characteristics may include an identity of a caller of the interface. Such identity may indicate whether the invocation was made by an operating system provided function, from within dynamically allocated memory, from within data sections of a process, etc. To this end, the characteristics of the memory interface usage may be tracked.

As noted above, enumeration of kernel mode pool memory at initialization, in addition to association of enumerated pool memory with a particular process, may be limited. Accordingly, full tracking of pool memory may be available only for regions allocated or regions in which properties were modified after initialization.

In this way, executable memory utilized with respect to the event may be analyzed, such as, for example, by identifying characteristics of such executable memory. As also shown, it is determined whether an owner of the executable memory is legitimate. Note decision 512. In the context of the present embodiment, a legitimate memory owner may include a memory owner expected based on a usage history of the executable memory, a history of characteristics of the executable memory, etc. In this way, it may be determined whether an owner of the executable memory associated with the noted call frame is legitimate.

Thus, based on the analysis of the executable memory (operation 510), it may be determined whether the noted call frame is associated with a legitimate execution profile for code associated with the event. For example, information gathered during the analysis (e.g. characteristics of the executable memory, usage of the executable memory, etc.) may be compared with a previously determined legitimate execution profile associated with the event. In one embodiment, the owner (e.g. process, backing dynamic link library, etc.) of the memory pointed to by the noted call frame may be compared against a discrete list of legitimate processes and modules expected to be involved in the handling of the event. In another embodiment, the history of the referenced memory regions may be further tracked, for example, via behavioral detection.

If it is determined that the executable memory owner is legitimate, the event handling is allowed to continue (operation 516). As shown, a next call frame associated with the event may be noted (operation 508). Optionally, such next call frame may only be noted until processing associated with the event concludes (not shown). In this way, another call frame associated with the event may be noted (operation 508), and associated executable memory analyzed (operation 510), for determining whether an owner of such executable memory is legitimate (operation 512).

However, if it is determined that the executable memory owner is not legitimate, malware is detected, as shown in operation 514. Thus, identification of executable memory associated with any noted call frame as being illegitimate may indicate that code associated with the event is further associated with malware. For example, illegitimate handling of the event may be identified based on such executable memory. As an option, an alert may be generated noting the detection of malware. Of course, any other desired action may also be taken in response to the detection of malware, such as logging the detection, blocking execution of the event, blocking execution of a system on which the event is executing, etc.

Accordingly, at least potentially unwanted activity may be detected based on execution profile monitoring of any desired executable code capable of being associated with an event. Furthermore, such detection may be performed at any desired system level (e.g. execution layers, etc.). For example, the detection may be performed at a kernel mode level, at a user mode level, at a BIOS level, at a CPU level, a microcode level, a virtualization level, etc.

In one exemplary embodiment, unwanted activity associated with a keystroke logger (key-logger) may be detected. For example, the execution of software handling a test keystroke may be monitored, and utilization of illegitimate software components during the handling may be detected. Such detection may be performed in the context of the Windows® NT operating system, as described below.

Initially, call frame monitoring may be enabled for a particular thread intended to be used for the key-logger detection. For example, call frame removal (based on RET instruction monitoring) may be utilized. With respect to the present example, it may be assumed that the same thread is utilized for the entire course of handling the test keystroke, and that the monitoring may include kernel mode and user mode handling of the keystroke event.

Additionally, a keystroke event is generated (e.g. by a user) and delivered directly to the bottommost component of the operating system that would be processing such an event. For example, such component may include the lowest level kernel mode driver in the keyboard filter driver stack, and may correspond to a point where a hardware keyboard event may be sent to the driver stack. Such may be delivered via an operating system supplied kernel mode API to invoke the driver stack with a keyboard event, as may also take place with a non-test keystroke event.

As an option, processing that occurs with a non-test keystroke event prior to delivery of the event to the bottommost portion of the keyboard driver stack may be validated, for example, by a hardware interrupt handler. Further, the handling of the test keystroke event proceeds. An initialized call frame monitoring notes each call frame as it is removed from the call stack. The ownership of the memory pointed to by each call frame (as the target of the RET instruction) may thus be determined.

Each of the memory region owners associated with the noted call frames is analyzed. Optionally, with respect to the present example, it may be assumed the discovery of any owner that is not part of a legitimate Microsoft® executable image represents a subversion of keystroke processing by malware. Of course, however, the legitimate owner may be indicated based on any other criteria. For example, third party software may also be predetermined to be legitimate, where such software is associated with processing of the keystroke to support specialized keyboard hardware through the inclusion of a filter driver.

As the call frame monitoring will be performed for both kernel mode and user mode handling of the keystroke event, malware monitoring the keystroke may be detected at any level, including malware inserted as a kernel mode keyboard filter driver, malware inserted via a kernel mode hook of system service APIs used for keystroke collection, malware inserted via a user mode hook of operating system library APIs used for keystroke collection, malware inserted as a loadable ActiveX® control running within an Internet Explorer® web browser, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of detecting at least potentially unwanted activity, comprising:
    monitoring, with a processor, an execution profile of code by utilizing call frame monitoring;
    noting, with the processor, a call frame associated with the code;
    identifying, with the processor, executable memory associated with the noted call frame, wherein the executable memory is backed by a loaded executable;
    identifying, with the processor, an owner of the executable memory by determining a file path of the loaded executable;
    determining, with the processor, whether the owner of the executable memory is legitimate; and
    identifying unwanted activity based on a determination that the owner of the executable memory is not legitimate.

2. The method of claim 1, wherein the code includes executable code.

3. The method of claim 1, wherein the code is associated with an event.

4. The method of claim 3, wherein the event includes invocation of a hooked interface.

5. The method of claim 3, wherein the event includes generation of an interrupt.

6. The method of claim 1, wherein the execution profile includes event handling associated with the code.

7. The method of claim 1, wherein the execution profile includes components executed by the code.

8. The method of claim 1, wherein the call frame monitoring includes monitoring call frames associated with the code that are added to an execution stack.

9. The method of claim 1, wherein the call frame monitoring includes monitoring call frames associated with the code that are removed from an execution stack.

10. The method of claim 1, further comprising holding an event associated with the code during initiation of the call frame monitoring.

11. The method of claim 1, wherein the at least potentially unwanted activity involves malware.

12. The method of claim 1, wherein the call frame is noted utilizing an inline hook.

13. The method of claim 1, wherein the call frame is noted utilizing virtualization.

14. The method of claim 1, wherein the loaded executable is an executable application file.

15. The method of claim 1, wherein the loaded executable is a loadable library.

16. A computer program product embodied on a non-transitory computer readable storage medium, comprising instructions stored thereon that when executed by one or more processors cause the one or more processors to:
    monitor an execution profile of code by utilizing call frame monitoring;
    note a call frame associated with the code;

identify executable memory associated with the noted call frame, wherein the executable memory is backed by a loaded executable;

identify an owner of the executable memory by determining a file path of the loaded executable;

determine whether the owner of executable memory associated with the noted call frame is legitimate; and identify unwanted activity based on a determination that the owner of the executable memory is not legitimate.

17. A system, comprising:

a memory; and a processor operatively coupled to the memory, the processor adapted to execute program code stored in the memory to:

monitor an execution profile of code by utilizing call frame monitoring, detect at least potentially unwanted activity based on the monitoring of the execution profile, wherein detecting the at least potentially unwanted activity comprises:

noting a call frame associated with the code, identifying executable memory associated with the noted call frame, wherein the executable memory is backed by a loaded executable, identifying an owner of the executable memory by determining a file path of the loaded executable, determining whether the owner of executable memory associated with the noted call frame is legitimate; and identifying unwanted activity based on a determination that the owner of the executable memory is not legitimate.

* * * * *

UNITED STATES PATENT AND TRADEMARK OFFICE
CERTIFICATE OF CORRECTION

PATENT NO. : 8,613,084 B2
APPLICATION NO. : 11/857373
DATED : December 17, 2013
INVENTOR(S) : Gregory William Dalcher Page 1 of 1

It is certified that error appears in the above-identified patent and that said Letters Patent is hereby corrected as shown below:

On the title page, item (56), in column 2, under "Other Publications", line 5, delete "Instalation" and insert -- Installation --, therefor.

On the title page, item (56), in column 2, under "Other Publications", line 5-6, delete "Dec. 16, 2002," and insert -- Oct. 16, 2002, --, therefor.

Signed and Sealed this
Twenty-ninth Day of April, 2014

Michelle K. Lee
*Deputy Director of the United States Patent and Trademark Office*